United States Patent
Xing et al.

(10) Patent No.: US 11,858,855 B1
(45) Date of Patent: Jan. 2, 2024

(54) LOW-TEMPERATURE SINTERED MICROWAVE DIELECTRIC CERAMIC MATERIAL AND PREPARATION METHOD THEREOF

(71) Applicant: Yangtze Delta Region Institute (Huzhou), University of Electronic Science and Technology of China, Huzhou (CN)

(72) Inventors: MengJiang Xing, Kunming (CN); XiaoZhen Li, Kunming (CN); YuanYuan Yang, Huzhou (CN); YanLing Luo, Wuxi (CN); HongYu Yang, Xi'an (CN); QingYang Fan, Xi'an (CN); YunSheng Zhao, Shenzhen (CN); Hao Li, Beijing (CN)

(73) Assignee: Yangtze Delta Region Institute (Huzhou), University of Electronic Science and Technology of China, Huzhou (CN)

( * ) Notice: Subject to any disclaimer, the term of this patent is extended or adjusted under 35 U.S.C. 154(b) by 0 days.

(21) Appl. No.: 18/352,264

(22) Filed: Jul. 14, 2023

(30) Foreign Application Priority Data

Oct. 21, 2022 (CN) .......................... 202211289950.1

(51) Int. Cl.
*C04B 35/462* (2006.01)
*C04B 35/49* (2006.01)
(Continued)

(52) U.S. Cl.
CPC .......... *C04B 35/49* (2013.01); *C04B 35/6261* (2013.01); *C04B 35/6264* (2013.01); *C04B 35/62645* (2013.01); *C04B 35/62685* (2013.01); *C04B 35/63424* (2013.01); *C04B 2235/3203* (2013.01); *C04B 2235/3232* (2013.01);
(Continued)

(58) Field of Classification Search
CPC ............................ C04B 35/49; C04B 35/462
See application file for complete search history.

(56) References Cited

FOREIGN PATENT DOCUMENTS

CN 115124340 A 9/2022

OTHER PUBLICATIONS

Li, Enzhu et al., Effects of Li2O—B2O3—SiO2 glass on the low-temperature sintering of Zn0.15Nb0.3Ti0.55O2 ceramics, Ceramics International, Jan. 31, 2018, pp. 8072-8080, vol. 44.
(Continued)

*Primary Examiner* — Karl E Group

(57) ABSTRACT

A low-temperature sintered microwave dielectric ceramic material and a preparation method thereof are provided. The ceramic material includes a base material and a low-melting-point glass material; a general chemical formula of the base material is $(Zn_{0.9}Cu_{0.1})_{0.15}Nb_{0.3}(Ti_{0.9}Zr_{0.1})_{0.55}O_2$; a percent by weight of the low-melting-point glass material is in a range of 1 wt. % to 2 wt. %; chemical compositions of the low-melting-point glass material include $A_2CO_3$-$M_2O_3$-$SiO_2$, A of which includes at least two of a lithium ion, a sodium ion, and a potassium ion, M of which includes at least one of a boron ion and a bismuth ion; and a sintering temperature of the ceramic material is in a range of 850° C. to 900° C. The microwave dielectric ceramic material has the advantages of low dielectric loss, simple and controllable process, etc., has good process stability, and can meet requirements for radio communication industry.

10 Claims, 1 Drawing Sheet

(51) Int. Cl.
*C04B 35/626* (2006.01)
*C04B 35/634* (2006.01)

(52) U.S. Cl.
CPC .................. *C04B 2235/3244* (2013.01); *C04B 2235/3251* (2013.01); *C04B 2235/3281* (2013.01); *C04B 2235/3284* (2013.01); *C04B 2235/3298* (2013.01); *C04B 2235/3409* (2013.01); *C04B 2235/3418* (2013.01); *C04B 2235/6562* (2013.01); *C04B 2235/96* (2013.01)

(56) References Cited

OTHER PUBLICATIONS

Ruyu Wang, et al., Effects of CuO Additives on the properities of ZnNb2O6 Dielectric Ceramics, Material Introduction, Nov. 15, 2005, pp. 133-135, Issue 11.

Hongyu Yang et al., Effects of ZrO2 substitution on crystal structure and microwave dielectric properties of Zn0.15Nb0.3(Ti1-xZrx)0.55O2 ceramics, Ceramics International, Sep. 7, 2018, pp. 22710-22717, vol. 44.

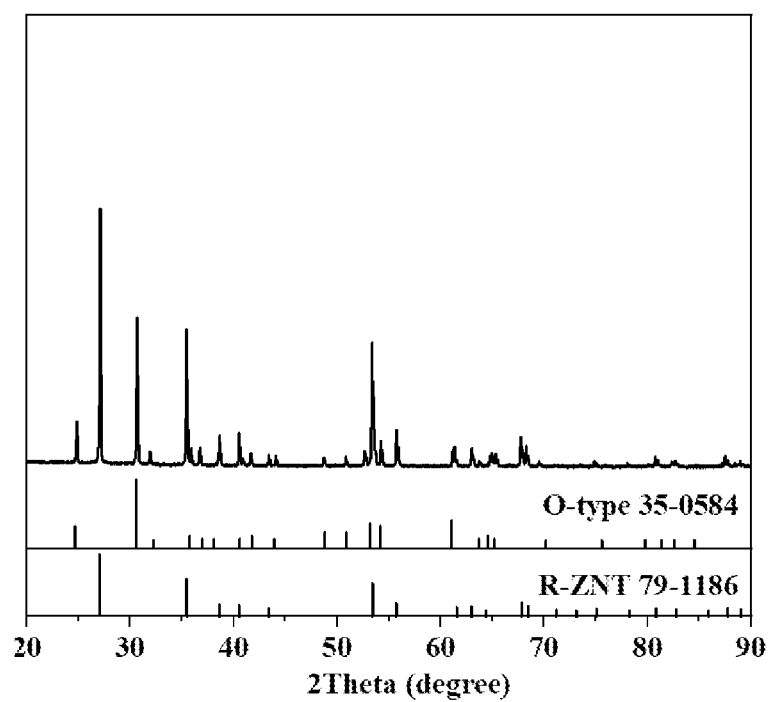

LOW-TEMPERATURE SINTERED MICROWAVE DIELECTRIC CERAMIC MATERIAL AND PREPARATION METHOD THEREOF

TECHNICAL FIELD

The disclosure relates to the field of electronic ceramics and their manufacturing technology, particularly to a low-temperature sintered microwave dielectric ceramic material and a preparation method thereof, which are applied in the field of low temperature co-fired ceramic (LTCC) technology.

BACKGROUND

In the context of an explosive growth of network traffic in mobile communication era, the fifth generation mobile communication technology (5G) is developed towards a millimeter wave band, thus the communication system has higher data rate and greater bandwidth, and spectrum resources available at the high frequency are abundant. Microwave dielectric ceramics have advantages of miniaturization, easy integration, high stability, low insertion loss, low power consumption, etc., and are widely applied to various electronic components of a 5G system, such as a dielectric resonator, a filter, a substrate, an antenna, a duplexer, a waveguide, etc. In addition, LTCC technology is an emergent and highlighted technology capable of integrating components in recent years, because of their excellent electronic, mechanical, and thermal properties. Moreover, LTCC materials are widely used in fields of substrates, packaging, and microwave devices, and are of great significance in realizing system-in-package (SiP). Recently, the LTCC materials have been successfully applied in wireless local area networks, terrestrial digital broadcasting, positioning system receivers, microwave systems, and other fields.

The performance of the microwave dielectric ceramic is evaluated in the following aspects: (1) a low sintering temperature (no more than 900° C. to realize co-firing with silver electrodes); (2) a suitable value for a dielectric constant $\varepsilon_r$; (3) a lower dielectric loss $\tan\delta$ ($\tan\delta = 1/Q$, Q is a quality factor, the lower the $\tan\delta$ being, the higher the quality factor Q, and generally using Q×f to represent a quality factor value at a certain resonant frequency); and (4) a temperature coefficient of resonant frequency $\tau_f$ value (used for temperature compensation).

Phase structures of $ZnO-TiO_2-Nb_2O_5$ and $ZnO-ZrO_2-Nb_2O_5$ systems are diversified according to various compositions and proportions of elements, and meanwhile, a ceramic system with excellent microwave dielectric properties has emerged in the above mentioned systems. For example, when researchers dope 0.1 mole of zirconium irons ($Zr^{4+}$) in the $Zn_{0.15}Nb_{0.3}Ti_{0.55}O_2$ system, it is found that the system has excellent microwave dielectric properties at 1150° C., namely that $\varepsilon_r$ is 68.6, Q×f is 13,921 gigahertz (GHz), $\tan\delta$ is $2.65\times10^{-4}$, and $\tau_f$ is 206.8 parts per million per ° C. (ppm/° C.). However, it can be found that the sintering temperature of the ceramic system is too high under this proportion, and the $\tau_f$ value is too large. Therefore, it is of great significance to reduce the sintering temperature of the system for expanding the application of the system in the field of LTCC technology.

In general, the following methods can reduce the sintering temperature of the ceramic system, including: (1) introducing a nanoscale powder or improving the preparation process, such as introducing a sol-gel process; (2) making cations be solid-dissolved to lattice sites through ion doping, making a temperature of forming phase reduced, which can reduce the final sintering temperature of the ceramic system to a certain extent, but cannot match with the silver electrode; and (3) selecting a low-melting-point glass material which is highly adaptive to the ceramic system, and reducing the sintering temperature of the final ceramic system through liquid phase sintering.

In summary, in order to address that the $Zn_{0.15}Nb_{0.3}(Ti_{0.9}Zr_{0.1})_{0.55}O_2$ system has the over-high sintering temperature and has a relative high temperature coefficient of resonant frequency, there is an urgent need to develop a ceramic material that has a simple and controllable process, a low dielectric loss, and a temperature coefficient with a low dielectric constant, and can meet application requirements of radio communication industry.

SUMMARY

Technical features and advantages of the disclosure are set forth in part in the following description, or can be apparent from the description, or may be learned by practicing the disclosure.

In order to overcome the technical problems in the related art, the disclosure provides a microwave dielectric ceramic material sintered at a low temperature (also referred to a low-temperature sintered microwave dielectric ceramic material). The microwave dielectric ceramic material includes a base material and a glass material with low melting point (i.e., low-melting-point glass material). A general chemical formula of the base material is $(Zn_{0.9}Cu_{0.1})_{0.15}Nb_{0.3}(Ti_{0.9}Zr_{0.1})_{0.55}O_2$; a percent by weight of the low-melting-point glass material is in a range of 1 wt. % to 2 wt. %; chemical compositions of the low-melting-point glass material include $A_2CO_3-M_2O_3-SiO_2$, A of which represents a lithium ion ($Li^+$), a sodium ion ($Na^+$), and a potassium ion ($K^+$), M of which represents a boron ion ($B^{3+}$) and a bismuth ion ($Bi^{3+}$); and a sintering temperature of the microwave dielectric ceramic material is in a range of 850 degree Celsius (° C.) to 900° C.

A crystal structure of the ceramic material described above is in coexistence of a tetragonal phase and an orthogonal phase structure. Furthermore, when the sintering temperature is 850° C., a dielectric constant of the ceramic material is 52.6, a dielectric loss is as low as $5.34\times10^{-4}$, a Q×f value is as high as 8,411 gigahertz (GHz), and a $\tau_f$ value is as low as 101.2 parts per million per ° C. (ppm/° C.).

In an embodiment, a mass ratio of $A_2CO_3:M_2O_3:SiO_2$ in the chemical compositions of the low-melting-point glass material is 38:40:22.

In an embodiment, the $A_2CO_3$ includes the following components in parts by weight: 15 parts of $Li_2CO_3$, 16 parts of $Na_2CO_3$, and 7 parts of $K_2CO_3$; and/or the $M_2O_3$ includes the following components in parts by weight: 34 parts of $B_2O_3$, and 6 parts of $Bi_2O_3$.

The disclosure further provides a preparation method for a low-temperature sintered microwave dielectric ceramic material, which is used to prepare the above-mentioned low-temperature sintered microwave dielectric ceramic material, including the following steps:

proportioning the base material: proportioning raw powders of ZnO, CuO, $TiO_2$, $ZrO_2$, $Nb_2O_5$ according to the general chemical formula $(Zn_{0.9}Cu_{0.1})_{0.15}Nb_{0.3}(Ti_{0.9}Zr_{0.1})_{0.55}O_2$ to obtain a pre-prepared powder;

grinding: putting the pre-prepared powder into a ball milling tank, selecting zirconium balls and deionized water as grinding media, and then performing ball milling on the pre-prepared powder in a planetary ball mill for 4 hours to 6 hours to obtain a mixed slurry, drying the mixed slurry in an oven to obtain a first dried powder after the ball milling is completed, and then sieving the first dried powder by a screen to obtain a ground powder, and pre-sintering the ground powder in an atmospheric atmosphere at 900° C. to 1000° C. for 4 hours to 6 hours to obtain a pre-sintered material;

proportioning the chemical compositions of the low-melting-point glass material: weighing and mixing raw powders of the chemical compositions of the low-melting-point glass material according to a preset ratio to obtain a glass powder, selecting zirconium balls and alcohol as grinding media, and then performing ball milling on the glass powder in a planetary ball mill for 6 hours to 8 hours to obtain a ball-milled powder, drying the ball-milled powder to obtain a second dried power, and then pre-sintering the second dried power for 3 hours to 6 hours at 600° C. to 650° C., followed by heating to 1450° C. to 1550° C. for melting for 4 hours to 6 hours to obtain glass melt, pouring the glass melt into ionized water for cooling to obtain a glass, and grinding the glass into uniform fine powders, thereby obtaining the glass material with low melting point;

mixing: adding the obtained low-melting-point glass material into the pre-sintered material according to the percent by weight to obtain a mixed powder, selecting zirconium balls and deionized water as grinding media, and then performing ball milling on the mixed powder in a planetary ball mill for 3 hours to 5 hours to obtain a ball-milled mixed powder, drying the ball-milled mixed powder to obtain a third dried powder, and then adding a binder into the third dried powder to granulate, thereafter obtaining a ceramic raw material; and sintering to prepare the microwave dielectric ceramic material: pressing and molding the ceramic raw material, discharging the ceramic raw material for 2 hours to 4 hours at a temperature of 400° C. to 450° C. with a heating rate of 2° C. per minute (° C./min) to 4° C./min, heating to 850° C. to 900° C. with the same heating rate of 2° C./min to 4° C./min, followed by heat preserving for 4 hours to 6 hours, thereby obtaining the low-temperature sintered microwave dielectric ceramic material.

In an embodiment, the raw powders of the chemical compositions of the low-melting-point glass material include: $Li_2CO_3$ powders, $Na_2CO_3$ powders, $K_2CO_3$ powders, $B_2O_3$ powders, and $Bi_2O_3$ powders.

In an embodiment, in the proportioning the chemical compositions of the low-melting-point glass material, a mass ratio of the $Li_2CO_3$ powders:the $Na_2CO_3$ powders:the $K_2CO_3$ powders:the $B_2O_3$ powders:the $Bi_2O_3$ powders:the $SiO_2$ is 15:16:7:34:6:22.

In an embodiment, in the grinding, a mass ratio of the pre-prepared powder:the zirconium balls:the deionized water is 1:5-7:2-4.

In an embodiment, in the proportioning the chemical compositions of the low-melting-point glass material, a mass ratio of the glass powder:the zirconium balls:the alcohol is 1:5-7:4-6.

In an embodiment, in the mixing, a mass ratio of the mixed powder:the zirconium balls:the deionized water is 1:4-5:3-5.

In an embodiment, in the mixing, the binder is an acrylic acid solution.

Beneficial effects of the disclosure are as follows.

According to the disclosure, the synthesis temperature of the phase structure is reduced by means of ion doping, and at the same time, the low-melting-point glass material of the $A_2CO_3$-$M_2O_3$—$SiO_2$ with high adaptability to the ceramic base material is introduced into the base material of the $Zn_{0.15}Nb_{0.3}(Ti_{0.9}Zr_{0.1})_{0.55}O_2$, thereby significantly reducing the sintering temperature and the temperature coefficient of resonant frequency. Furthermore, the prepared low-temperature sintered microwave dielectric ceramic material has the advantages of low dielectric loss, simple and controllable process, low cost, etc. Moreover, the ceramic material has good process stability, can be used as the dielectric material of the LTCC technology, and meets the application requirements of the radio communication industry.

BRIEF DESCRIPTION OF DRAWING

The disclosure is described in detail with reference to an attached drawing in combination with embodiments. Therefore, advantages and implementations of the disclosure will be more apparent. Contents shown in the attached drawing are merely used to explain the disclosure and are not intended to limit the disclosure in any sense.

FIGURE illustrates an X-ray diffraction (XRD) diagram of an embodiment 1 of the disclosure.

DETAILED DESCRIPTION OF EMBODIMENTS

Implementations of the disclosure are described in detail with reference to embodiments of the disclosure. The following embodiments are used to illustrate the disclosure, but cannot be used to limit the scope of the disclosure.

The disclosure provides a low-temperature sintered microwave dielectric ceramic material. The microwave dielectric ceramic material includes a base material and a low-melting-point glass material; a general chemical formula of the base material is $(Zn_{0.9}Cu_{0.1})_{0.15}Nb_{0.3}(Ti_{0.9}Zr_{0.1})_{0.55}O_2$; a percent by weight of the low-melting-point glass material is in a range of 1 wt. % to 2 wt. %, namely that a content of the low-melting-point glass material in the ceramic material is 1% to 2%; chemical compositions of the low-melting-point glass material include $A_2CO_3$-$M_2O_3$—$SiO_2$, A of which represents a lithium ion (also referred to a $Li^+$), a sodium ion (also referred to a $Na^+$), and a potassium ion (also referred to a $K^+$), and M of which represents a boron ion (also referred to $B^{3+}$) and a bismuth ion (also referred to $Bi^{3+}$). A sintering temperature of the ceramic material is in a range of 850 degree Celsius (° C.) to 900° C. A crystal structure of the ceramic material is in coexistence of a tetragonal phase and an orthogonal phase; and under the sintering temperature of 850° C., a dielectric constant of the ceramic material is 52.6, a dielectric loss is as low as $5.34 \times 10^{-4}$, a Q×f value is as high as 8,411 gigahertz (GHz), and a $\tau_f$ value is as low as 101.2 parts per million per ° C. (ppm/° C.). A mass ratio $A_2CO_3$:$M_2O_3$:$SiO_2$ in the chemical compositions of the low-melting-point glass material is 38:40:22. The $A_2CO_3$ can be $Li_2CO_3$, and/or $Na_2CO_3$, and/or $K_2CO_3$, which is determined according to actual needs. The $M_2O_3$ can be $B_2O_3$, and/or $Bi_2O_3$. In an illustrated embodiment of the disclosure, the $A_2CO_3$ includes the following components in parts by weight: 15 parts of $Li_2CO_3$, and 16 parts of $Na_2CO_3$, and 7 parts of $K_2CO_3$; and the $M_2O_3$ includes the following components in parts by weight: 34 parts of $B_2O_3$, and 6 parts of $Bi_2O_3$.

The disclosure further provides a preparation method for preparing the above mentioned low-temperature sintered microwave dielectric ceramic material, including following steps.

Proportioning the base material: raw powders of ZnO, CuO, TiO$_2$, ZrO$_2$, Nb$_2$O$_5$ are proportioned according to the general chemical formula (Zn$_{0.9}$Cu$_{0.1}$)$_{0.15}$Nb$_{0.3}$(Ti$_{0.9}$Zr$_{0.1}$)$_{0.55}$O$_2$ to obtain a pre-prepared powder.

Grinding: the pre-prepared powder is put into a ball milling tank, zirconium balls and deionized water are selected as grinding media, and then ball milling is performed on the pre-prepared powder in a planetary ball mill for 4 hours to 6 hours to obtain a mixed slurry, the mixed slurry is dried in an oven to obtain a first dried powder after the ball milling is completed, and then the first dried powder is sieved by a 100-mesh screen to obtain a ground powder, and the ground powder is pre-sintered in an atmospheric atmosphere at 900° C. to 1000° C. for 4 hours to 6 hours to obtain a pre-sintered material. In the grinding process, a mass ratio of the pre-prepared powder:the zirconium balls:the deionized water is 1:5-7:2-4;

Proportioning the chemical compositions of the low-melting-point glass material: raw powders of the chemical compositions of the low-melting-point glass material are weighed and mixed according to a preset ratio to obtain a glass powder, zirconium balls and alcohol are selected as grinding media, and then ball milling is performed on the glass powder in a planetary ball mill for 6 hours to 8 hours to obtain a ball-milled powder, the ball-milled powder is dried to obtain a second dried power, and then the second dried power is pre-sintered for 3 hours to 6 hours at 600° C. to 650° C., followed by heating to 1450° C. to 1550° C. for melting for 4 hours to 6 hours to obtain glass melt, the glass melt is poured into ionized water for cooling to obtain a glass, and the glass is ground into uniform fine powders, thereby obtaining the low-melting-point glass material. The preset ratio is determined according to a percent by weight of the chemical compositions of the low-melting-point glass material, namely that a mass ratio of A$_2$CO$_3$:M$_2$O$_3$:SiO$_2$ in the chemical compositions of the low-melting-point glass material is 38:40:22. The raw powders of the low-melting-point glass material include A$_2$CO$_3$ powders, M$_2$O$_3$ powders, and SiO$_2$ powders. Specially, the A$_2$CO$_3$ powders include Li$_2$CO$_3$ powders, and/or Na$_2$CO$_3$ powders, and/or K$_2$CO$_3$ powders. In an illustrated embodiment, the A$_2$CO$_3$ powders include at least two of a group consisting of Li$_2$CO$_3$ powders, Na$_2$CO$_3$ powders, and K$_2$CO$_3$ powders. The M$_2$O$_3$ powders include B$_2$O$_3$ powders, and/or Bi$_2$O$_3$ powders. In an illustrated embodiment of the disclosure, the raw powders of the chemical compositions of the low-melting-point glass material include the Li$_2$CO$_3$ powders, the Na$_2$CO$_3$ powders, the K$_2$CO$_3$ powders, the B$_2$O$_3$ powders, the Bi$_2$O$_3$ powders, and the SiO$_2$ powders. In the proportioning the chemical compositions of the low-melting-point glass material, a mass ratio of the Li$_2$CO$_3$ powders:the Na$_2$CO$_3$ powders:the K$_2$CO$_3$ powders:the B$_2$O$_3$ powders:the Bi$_2$O$_3$ powders:the SiO$_2$ powders is 15:16:7:34:6:22; and a mass ratio of the glass powder:the zirconium balls:the alcohol is 1:5-7:4-6.

Mixing: the obtained low-melting-point glass material is added into the pre-sintered material according to the percent by weight of 1 wt. % to 2 wt. % to obtain a mixed powder, zirconium balls and deionized water are selected as grinding media again, and then ball milling is performed on the mixed powder in a planetary ball mill for 3 hours to 5 hours to obtain a ball-milled mixed powder, the ball-milled mixed powder is dried to obtain a third dried powder, followed by adding a binder into the third dried powder to granulate, thereafter obtaining a ceramic raw material. In the mixing process, a mass ratio of the mixed powder the zirconium balls:the deionized water is 1:4-5:3-5. The binder is an acrylic acid solution.

Sintering to prepare the microwave dielectric ceramic material: the ceramic raw material is pressed and molded, and then the ceramic raw material is discharged for 2 hours to 4 hours at a temperature of 400° C. to 450° C. with a heating rate of 2° C. per minute (° C./min) to 4° C./min to obtain a discharged ceramic raw material, and then the discharged ceramic raw material is heated to 850° C. to 900° C. with the same heating rate of 2° C./min to 4° C./min, followed by heat preserving for 4 hours to 6 hours, thereby obtaining the low-temperature sintered microwave dielectric ceramic material.

In order to better explain the technical effects of the disclosure, 3 samples for embodiments 1-3 are prepared by the preparation method provided by the disclosure. The chemical compositions of the low-melting-point glass material added in each of the embodiments 1-3 are determined as the illustrated technical solution in the above described preparation method. The mass of each chemical composition in each embodiment and the corresponding sintering temperature of each embodiment are shown in Table 1, and dielectric properties of each embodiment are shown in Table 2.

The mass of each chemical composition and the corresponding sintering temperature in the embodiments 1-3 are shown in the following Table 1.

| Sample number for embodiment | | 1 | 2 | 3 |
| --- | --- | --- | --- | --- |
| Mass of each chemical composition/gram abbreviated as g | ZnO | 11.170 | 11.170 | 11.170 |
| | CuO | 1.213 | 1.213 | 1.213 |
| | Nb$_2$O$_5$ | 40.535 | 40.535 | 40.535 |
| | TiO$_2$ | 40.191 | 40.191 | 40.191 |
| | ZrO$_2$ | 6.890 | 6.890 | 6.890 |
| | Li$_2$CO$_3$ | 0.300 | 0.300 | 0.300 |
| | Na$_2$CO$_3$ | 0.320 | 0.320 | 0.320 |
| | K$_2$CO$_3$ | 0.140 | 0.140 | 0.140 |
| | B$_2$O$_3$ | 0.680 | 0.680 | 0.680 |
| | Bi$_2$O$_3$ | 0.120 | 0.120 | 0.120 |
| | SiO$_2$ | 0.440 | 0.440 | 0.440 |
| Sintering temperature (° C.) | | 850 | 875 | 900 |

| Sample number for embodiment | Dielectric constant $\varepsilon_r$ | tanδ (10$^{-4}$) | Q × f (GHz) | $\tau_f$ (ppm/° C.) |
| --- | --- | --- | --- | --- |
| 1 | 52.6 | 5.34 | 8,411 | 101.2 |
| 2 | 52.8 | 5.55 | 7,978 | 101.8 |
| 3 | 52.6 | 5.12 | 8,574 | 100.9 |

It can be seen from the data shown in Table 1 and Table 2 above that in the embodiments, the dielectric constants of the samples are very stable and are close to 52.7, which indicates that when the sintering temperature is at 850° C., the corresponding sample has been sintered compact, and there is no variation for densification when the sintering temperature continues to rise, thereby stabilizing the dielectric constant. Compared with a ceramic material without adding the glass material, the sintering temperature of the sample is greatly reduced (from 1150° C. to 850° C.), and the $\tau_f$ value is also greatly reduced from 206.8 ppm/° C. to 101.2 ppm/° C. However, the Q×f value has a small amplitude reduction trend, in view of the comprehensive sintering temperature and the temperature coefficient of resonant frequency, the glass material is excellently matched with the ceramic base material. Therefore, the low-temperature sintered microwave dielectric ceramic material can be applied to the technical field of LTCC.

FIGURE illustrates an X-ray diffraction (XRD) diagram of the embodiment 1. After test, the phase composition of the ceramic material is two-phase coexistence, a major crystal phase of which is a tetragonal phase matched with a standard card 79-1186 of the joint committee on powder diffraction standards abbreviated as JCPDS (referred to International Centre for Diffraction data), and a subordination crystal phase of which is an orthogonal phase matched with a standard card 35-0584. In addition, other excess diffraction peaks are not found, indicating that the introduction of the glass material does not change the phase composition.

The illustrated embodiments of the disclosure are described above with reference to the embodiments and the attached drawings. Those skilled in the related art can make a variety of variants to implement the disclosure without departing from the scope and substance of the disclosure. For example, some technical features illustrated or described in an embodiment may be used in another embodiment to obtain a still another embodiment. The above description is merely the illustrated embodiments of the disclosure, and are not therefore intended to limit the scope of the disclosure, and the equivalent changes made by the description and the attached drawings of the disclosure are all covered in the scope of the disclosure.

What is claimed is:

1. A microwave dielectric ceramic material, comprising: a base material and a glass material;
   wherein a chemical formula of the base material is $(Zn_{0.9}Cu_{0.1})_{0.15}Nb_{0.3}(Ti_{0.9}Zr_{0.1})_{0.55}O_2$; a percent by weight of the glass material is in a range of 1 wt. % to 2 wt. %; chemical compositions of the glass material comprise $A_2CO_3\text{-}M_2O_3\text{---}SiO_2$, wherein A represents a lithium ion ($Li^+$), a sodium ion ($Na^+$), and a potassium ion ($K^+$), M represents a boron ion ($B^{3+}$) and a bismuth ion ($Bi^{3+}$); and a sintering temperature of the microwave dielectric ceramic material is in a range of 850 degree Celsius (° C.) to 900° C.

2. The microwave dielectric ceramic material as claimed in claim 1, wherein a mass ratio of $A_2CO_3:M_2O_3:SiO_2$ in the chemical compositions of the glass material is 38:40:22.

3. The microwave dielectric ceramic material as claimed in claim 1, wherein the $A_2CO_3$ comprises the following components in parts by weight: 15 parts of $Li_2CO_3$, 16 parts of $Na_2CO_3$, and 7 parts of $K_2CO_3$; and/or wherein the $M_2O_3$ comprises the following components in parts by weight: 34 parts of $B_2O_3$, and 6 parts of $Bi_2O_3$.

4. A preparation method of the microwave dielectric ceramic material as claimed in claim 1, comprising following steps:
   proportioning the base material: proportioning raw powders of ZnO, CuO, $TiO_2$, $Zr_{02}$, $Nb_2O_5$ according to the chemical formula $(Zn_{0.9}Cu_{0.1})_{0.15}Nb_{0.3}(Ti_{0.9}Zr_{0.1})_{0.55}O_2$ to obtain a pre-prepared powder,
   grinding: putting the pre-prepared powder into a ball milling tank, selecting zirconium balls and deionized water as grinding media, and then performing ball milling on the pre-prepared powder in a planetary ball mill for 4 hours to 6 hours to obtain a mixed slurry, drying the mixed slurry in an oven to obtain a first dried powder after the ball milling is completed, and then sieving the first dried powder by a screen to obtain a ground powder, and pre-sintering the ground powder in an atmospheric atmosphere at 900° C. to 1000° C. for 4 hours to 6 hours to obtain a pre-sintered material;
   proportioning the chemical compositions of the glass material: weighing and mixing raw powders of the chemical compositions of the glass material according to a preset ratio to obtain a glass powder, selecting zirconium balls and alcohol as grinding media, and then performing ball milling on the glass powder in a planetary ball mill for 6 hours to 8 hours to obtain a ball-milled powder, drying the ball-milled powder to obtain a second dried power, and then pre-sintering the second dried power for 3 hours to 6 hours at 600° C. to 650° C., followed by heating to 1450° C. to 1550° C. for melting for 4 hours to 6 hours to obtain glass melt, pouring the glass melt into ionized water for cooling to obtain a glass, and grinding the glass into uniform fine powders, thereby obtaining the glass material;
   mixing: adding the obtained glass material into the pre-sintered material according to the percent by weight to obtain a mixed powder, selecting zirconium balls and deionized water as grinding media, and then performing ball milling on the mixed powder in a planetary ball mill for 3 hours to 5 hours to obtain a ball-milled mixed powder, drying the ball-milled mixed powder to obtain a third dried powder, and then adding a binder into the third dried powder to granulate, thereafter obtaining a ceramic raw material; and
   sintering to prepare the microwave dielectric ceramic material: pressing and molding the ceramic raw material, discharging the ceramic raw material for 2 hours to 4 hours at a temperature of 400° C. to 450° C. with a heating rate of 2° C. per minute (° C./min) to 4° C./min, heating to 850° C. to 900° C. with the same heating rate of 2° C./min to 4° C./min, followed by heat preserving for 4 hours to 6 hours, thereby obtaining the microwave dielectric ceramic material.

5. The preparation method of the microwave dielectric ceramic material as claimed in claim 4, wherein the raw powders of the chemical compositions of the glass material comprise: $Li_2CO_3$ powders, $Na_2CO_3$ powders, $K_2CO_3$ powders, $B_2O_3$ powders, and $Bi_2O_3$ powders.

6. The preparation method of the microwave dielectric ceramic material as claimed in claim 5, wherein in the proportioning the chemical compositions of the glass material, a mass ratio of the $Li_2CO_3$ powders:the $Na_2CO_3$ powders:the $K_2CO_3$ powders:the $B_2O_3$ powders:the $Bi_2O_3$ powders:the $SiO_2$ is 15:16:7:34:6:22.

7. The preparation method of the microwave dielectric ceramic material as claimed in claim 4, wherein in the grinding, a mass ratio of the pre-prepared powder:the zirconium balls:the deionized water is 1:5-7:2-4.

8. The preparation method of the microwave dielectric ceramic material as claimed in claim 4, wherein in the proportioning the chemical compositions of the glass material, a mass ratio of the glass powder:the zirconium balls:the alcohol is 1:5-7:4-6.

9. The preparation method of the microwave dielectric ceramic material as claimed in claim 4, wherein in the mixing, a mass ratio of the mixed powder:the zirconium balls:the deionized water is 1:4-5:3-5.

10. The preparation method of the microwave dielectric ceramic material as claimed in claim 4, wherein in the mixing, the binder is an acrylic acid solution.

* * * * *